United States Patent [19]

Hashimoto

[11] Patent Number: 4,737,979
[45] Date of Patent: Apr. 12, 1988

[54] AUTOMATIC TELEPHONE ANSWERING DEVICE WITH PAGING FUNCTION

[75] Inventor: Kazuo Hashimoto, Tokyo, Japan

[73] Assignee: Hashimoto Corporation, Tokyo, Japan

[21] Appl. No.: 820,352

[22] Filed: Jan. 21, 1986

[30] Foreign Application Priority Data

Jan. 21, 1985 [JP] Japan .................... 60-8658
Mar. 1, 1985 [JP] Japan .................... 60-40673

[51] Int. Cl.⁴ .................... H04M 1/64; H04M 1/65
[52] U.S. Cl. .................... 379/82; 379/79; 379/74; 379/70
[58] Field of Search .................... 379/68-70, 379/74, 77, 79-82, 102, 211

[56] References Cited

U.S. PATENT DOCUMENTS

| | | |
|---|---|---|
| 3,784,721 | 1/1974 | Kilby . |
| 3,793,487 | 2/1974 | Kilby . |
| 3,935,390 | 1/1976 | Winterhalter .................... 379/80 |
| 4,065,642 | 12/1977 | McClure .................... 379/77 |
| 4,072,824 | 2/1978 | Phillips .................... 379/70 |
| 4,074,078 | 2/1978 | Jansen . |
| 4,172,969 | 10/1979 | Levine et al. .................... 379/70 |
| 4,387,272 | 6/1983 | Castro et al. . |
| 4,475,009 | 10/1984 | Rais et al. .................... 379/211 |
| 4,525,600 | 6/1985 | Hashimoto . |
| 4,549,045 | 10/1985 | Castro et al. . |

Primary Examiner—Raymond F. Cardillo
Assistant Examiner—James E. Tomassini
Attorney, Agent, or Firm—Lowe Price LeBlanc Becker & Shur

[57] ABSTRACT

A record/play unit and a tape controller in an automatic telephone answering device with a paging function that sets an incoming message tape in a record mode in response to a beep tone generated upon completion of the sending of a first, normal, outgoing message and a second outgoing message for providing a paging procedure to a caller when an incoming message is not recorded by the caller after the beep tone is generated. The controller thereafter drives an engaging section in response to a special code sent by the calling party. The engaging section temporarily disengages the device from the telepone lines and then engages the device with the telephone lines again. Subsequently, a DTMF oscillator is operated to dial a prestored telephone number.

11 Claims, 4 Drawing Sheets

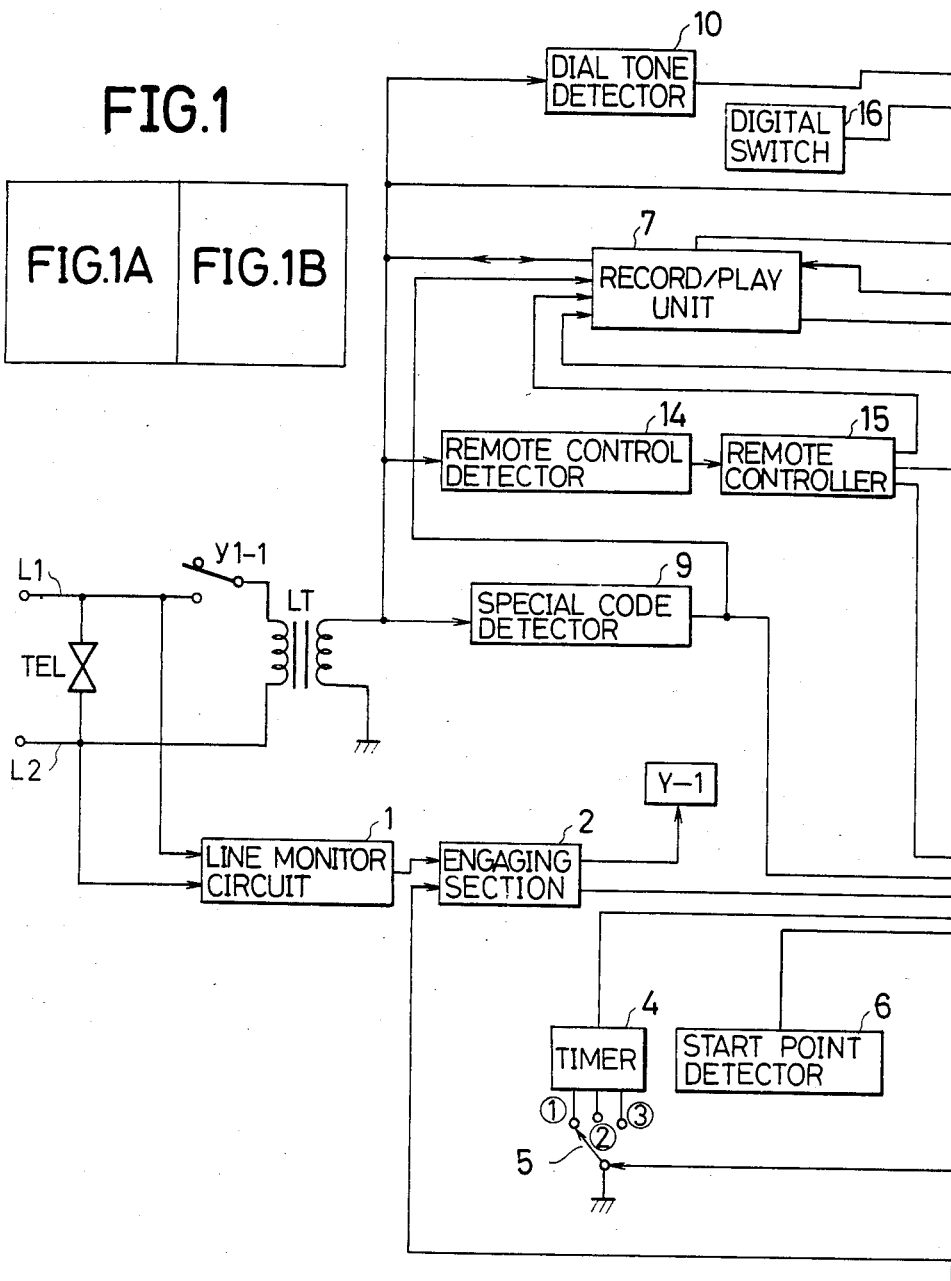

FIG. 5a  RELAY Y-1

FIG. 5b  RESET SIGNAL

FIG. 5c  2 SEC RESET SIGNAL

FIG. 5d  RELAY Y-1

AUTOMATIC TELEPHONE ANSWERING DEVICE WITH PAGING FUNCTION

BACKGROUND OF THE INVENTION

The present invention relates to an automatic telephone answering device with a paging function.

Conventional automatic telephone answering devices with a paging function include a device which calls a paging company upon reception of a message previously recorded by a calling party, as described in Japanese Patent Publication No. 43-25607, and equivalent devices commercially available in the U.S.A. In these conventional devices, recording an outgoing instruction message on a telephone answering device (TAD) is made difficult because of complicated instructions necessitated by the complex operation. Furthermore, it is also difficult for many calling parties to understand the outgoing message and follow instructions represented by the outgoing message.

SUMMARY OF THE INVENTION

It is an object of the present invention to eliminate the conventional drawbacks described above.

According to an aspect of the present invention, an automatic telephone answering device with a paging function comprises: means for sending to a calling party a first outgoing message prerecorded on a first part of an outgoing message tape, such as a first half thereof representing a normal outgoing message, and a second outgoing message prerecorded on a second part of the outgoing message tape, such as the second half thereof, representing a message for giving a paging instruction to a calling party who wishes to urgently contact the owner of the automatic telephone answering device upon reception of an incoming call from the calling party; means for setting an incoming message tape in a record mode in response to a beep tone generated upon completion of the sending of the first outgoing message; means for sending the second outgoing message when the calling party does not record an incoming message even after the beep tone is generated; means responsive to a special code sent by the calling party upon completion of the sending of the second outgoing message; and means for temporarily disengaging the automatic telephone answering device from the telephone lines upon operation of the responsive means, engaging the telephone answering device to the telephone lines again, and dialing a prestored telephone number.

According to another aspect of the present invention, an automatic telephone answering device comprises: the same outgoing message sending means as described above; means for sending a beep tone to a calling party upon completion of the sending of the first and second outgoing messages, recording an incoming message on an incoming message tape, and setting the telephone answering device in a standby mode; paging means for disengaging the telephone answering device from the telephone lines when the calling party sends a signal in accordance with the giving of the second outgoing message before the telephone answering device is set in the standby mode and then forming an engaging circuit to call a paging destination; and means for temporarily setting the telephone answering device in the standby mode after paging so as to allow the telephone answering device to receive a first incoming call.

Unlike conventional telephone answering devices with a paging function, the present invention is simpler than the conventional device and is easier to operate, thus providing an easy understanding of the outgoing message by the calling party so that ordinary persons can use the telephone answering device in combination with the paging device. This advantage results in a new communication means, thus providing a great practical effect.

The present invention is exemplified by a dial system using a combination of different frequencies such as a touch tone. However, the present invention can also be applied to a pulse system with a paging function as well as to a tone system with a paging function.

BRIEF DESCRIPTION OF THE DRAWINGS

FIGS. 1A and 1B are block diagrams of a telephone answering device according to an embodiment of the present invention;

FIGS. 5a–5d show timing charts for various voltage levels in the circuits of FIGS. 1a, 1b and 4.

DETAILED DESCRIPTION OF THE PREFERRED EMBODIMENTS

Figure 1B:
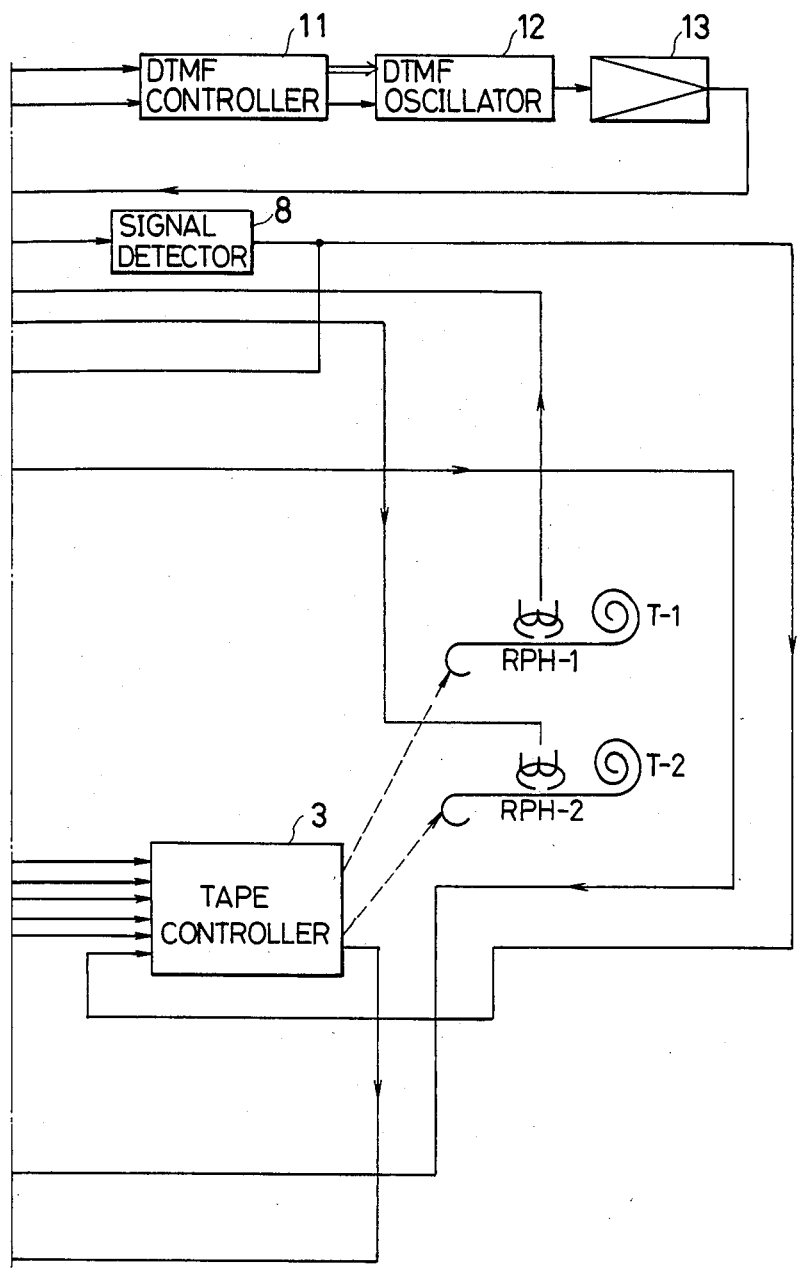
Figure 2:
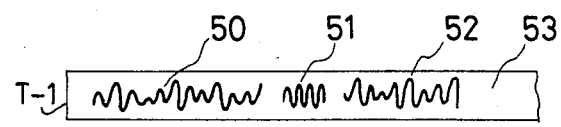
FIG. 2 is a representation for explaining recorded contents as outgoing messages on an outgoing message tape in the device shown in FIG. 1.

FIGS. 1A and 1B show an automatic telephone answering device according to an embodiment of the present invention. Referring to FIGS. 1A and 1B, reference symbols L1 and L2 denote telephone lines; LT, a line transformer; and TEL, a telephone set connected to the automatic telephone answering device. Reference numeral 1 denotes a line monitor circuit for detecting a ringing signal and an on-hook signal from a calling party; and 2, an engaging section turned on in response to an output from the line monitor circuit 1 to energize a load relay Y-1, thereby engaging the telephone answering device to the telephone lines L1 and L2 through a contact y1-1 of the relay Y-1. Reference numeral 3 denotes a tape controller for driving outgoing and incoming message tapes T-1 and T-2 at normal speed, and rewinding and stopping them. In that regard, tape controller 3 has two built in time constants, such as 0.5 and 2 seconds, to actuate relay Y-1. Reference numeral 4 denotes a timer for the incoming message tape T-2 in a paging mode (to be described later); and 5 denotes a timer selection switch for setting the operating time of the timer 4 to 10, 20 or 30 seconds manually or by remote control (to be described in detail later). In addition to timing control fo the paging mode, timer 4 and switch 5 may be used to determine the permitted length of a normal incoming message to be recorded on tape T-2, although VOX (voice controlled operation is also contemplated) under control of signal detector 8, described later. Reference numeral 6 denotes a start point (end point) detector for the outgoing and incoming message tapes T-1 and T-2; 7, a record/play unit for the tapes T-1 and T-2; 8, a signal detector for detecting a beep tone, voice signal, or a silent portion on the outgoing message tape T-1 (to be described in detail later) and for detecting absence of an incoming signal to initiate paging; and 9, a special code detector for detecting a special code (e.g., a "#" dial signal from a pushbutton phone) from the calling party. Reference numeral 10 denotes a dial tone detector for detecting a dial tone on the telephone lines during paging (to be described in detail later); and 11, a DTMF controller responsive to an output from the dial tone detector 10 to control a DTMF oscillator 12 (to be described below). The DTMF controller 11 will be described in detail later. Reference numeral 12 denotes the DTMF oscillator which is responsive to controller 10 for generating a speed dialing number (e.g., a code number represented by "*00"; and 13, an amplifier for amplifying the speed dialing number. Reference numeral 14 denotes a remote control signal detector for detecting a remote control signal for allowing a calling party to hear, by remote control, an incoming message recorded on the incoming message tape T-2. Reference numeral 15 denotes a remote controller for generating a signal for controlling the tape controller 3 and the record/play unit 7. Reference numeral 16 denotes a digital switch for selecting the speed dialing number. A first outgoing message 50, a beep tone 51 and a second outgoing, message 52 are recorded on the outgoing message tape T-1 in the order named, as shown in FIG. 2. Reference numeral 53 denotes a silent portion of the tape T-1. The first outgoing message 50 is exemplified by a message such as "This is Hashimoto Corporation. We are closed. If you wish to leave a message, please do so after you hear the beep tone. If your urgently need to speak with a person in charge, please wait." The second outgoing message 52 following the beep tone 51 is given as "Please depress the "#" button and give your name and phone number. The person in charge will be directly paged." In a second embodiment, an outgoing message 50' and the beep tone 51 are prerecorded in the outgoing message tape T-1 in the order shown in FIG. 3. The outgoing message 50' is given as "This is Hashimoto Corporation. We are closed. If you wish to leave a message, please do so after you hear the beep tone. If you urgently need to speak with a person in charge, he will be paged. To page the person in charge, please depress the "#" button after leaving a brief message."

The operation of the first embodiment will now be described in detail. When an incoming call from a calling party is received, a ringing signal is detected by the line monitor circuit 1. An output from the line monitor circuit 1 drives the engaging section 2, and the load relay Y-1 is then held operative. The telephone answering device is engaged with the telephone lines L1 and L2 through the contact y1-1 of the relay Y-1. In this state, the ringing signal is disabled, and the calling party can communicate with the telephone answering device. At the same time, an output from the engaging section 2 causes the tape controller 3 to start. The outgoing message tape T-1 is then driven from the start point at normal speed. The first outgoing message 50 is reproduced by a record/play head RPH-1 and is amplified by the record/play unit 7. The amplified first outgoing message 50 sent onto the telephone lines L1 and L2 through the line transformer LT. When the first outgoing message 50 to the calling party has been completed, the beep tone 51 is sent. The beep tone 51 is detected by the signal detector 8. One output from the signal detector 8 is supplied to the tape controller 3. The outgoing message tape T-1 is stopped immediately after the beep tone 51 is generated, and at the same time the incoming message tape T-2 is started at normal speed. The other output from the signal detector 8 is supplied to the record/play section 7 to set the unit 7 in the record mode for recording an incoming message on the incoming message tape T-2 through the line transformer LT, the record/play unit 7 and the record/play head RPH-2. At the same time, when the incoming message is detected as a voice message by the signal detector 8, recording continues as long as the voice message continues. When the calling party records his message and hangs up the telephone receiver (not shown), the line monitor circuit 1 detects a pulse generated across the telephone lines L1 and L2 and a change in line voltage thereacross. An output from the line monitor circuit 1 resets the engaging section 2 to deenergize the relay Y-1. The telephone answering device is disengaged by the contact y1-1 from the telephone lines L1 and L2. The output from the engaging section 2 is supplied to the tape controller 3 to stop the driving of the incoming message tape T-2 The outgoing message tape stopped at the beep tone position is rewound to the start point, and the telephone answering device is set in the standby mode.

Upon reception of an incoming call representing that the calling party urgently wishes to contact a person in charge, when the calling party does not give any message after the first outgoing message 50 and the beep tone 51 are sent, the signal detector 8 detects a nonsignal duration. The output from the signal detector 8 is generated to switch the record/play unit 7 from the record mode to the play mode. Furthermore, the incoming message tape T-2 is stopped by the tape controller 3, and the outgoing message tape T-1, stopped at the position where the beep tone 51 was sent, is started again. If the automatic telephone answering device has two separate amplifiers for the outgoing and incoming messages tapes T-1 and T-2, the incoming message tape T-2 can be continuously held in the record mode. The calling party can hear the second outgoing message 52 upon restarting of the outgoing message tape T-1. When the calling party depresses the "#" button on a push-button phone in accordance with the instruction represented by the second outgoing message 52, the corresponding tone is detected by the special code detector 9 through the line transformer LT. An output from the special code detector 9 is supplied to the tape controller 3 to stop the second outgoing message on tape T-1, and the incoming message tape T-2 is started at normal speed in the recording mode. At the same time, the output from the special code detector 9 is supplied to the record/play unit 7, so that the unit 7 is set in the record mode for recording an incoming message on the incoming message tape T-2. The recording state continues for the operating time of the timer 4. For example, when the timer section switch 5 is set to position 1, the timer time is 10 seconds; when set to position 2, 20 seconds; and when set to position 3, 30 seconds. When the operation time of the timer 4 is set to be 10 seconds, the engaging section 2 is reset (i.e., deactivated) by the tape controller 3 five seconds after starting of the timer 4, thereby deenergizing the relay Y-1 to disengage temporarily the telephone lines L1 and L2. Therefore, the calling party has about 5 seconds to record his name and phone number.

For the remaining 5 seconds of the timer 4, the recording state of the incoming message tape T-2 continues. Dialing information during paging is recorded on the incoming message tape T-2 after reenergizing of telephone lines L1-L2 (as described in the following) and is preserved as a record. When the operating time of the timer 4 has elapsed, the incoming message tape T-2 is stopped.

Similarly, for a setting of switch 5 to provide a 30 second time, the calling party has 25 seconds to record a message. Thereafter, upon initiation of a paging operation, the paged number is recorded on tape T-2 in the last five seconds of the 30 second period.

When the output from the tape controller 3 resets the engaging section 2, the relay Y-1 is energized again after one second upon operation of a one-second timer (not shown) built into the engaging section 2. The telephone lies L1 and L2 are thus set in the offhook state. Since a dial tone is sent from a telephone station, the dial tone is detected by the dial tone detector 10 to drive the DTMF controller 11. In this case, the DTMF controller 11 is started to generate a conventional telephone number or a speed dialing number, e.g., "*00", set by the digital switch 16. A four-bit address signal representing the "*" code, or other code which may be used to access speed dialing in accordance with the local telephone company, is supplied from four address lines AD of the DTMF controller 11 to the DTMF oscillator 12. When a one-shot pulse is also supplied from a start signal terminal ST of the DTMF controller 11 to the DTMF oscillator 12, the DTMF oscillator 12 generates an "*" tone. This output is amplified by the amplifier 13 to a proper level. The output at the proper level is sent to a telephone station or center through the line transformer LT because a short duration reset signal is provided (as described below) and the telephone lines are already engaged by relay Y-1. When sending of the conventional or speed dial number is completed, the telephone station or center calls the paging company which pages a wireless receiving set, such as a portable pager, (not shown) carried by the person in charge. As mentioned above, the dial number may also be recorded by the calling party on the incoming message tape T-2 within the operating time of the timer 4 and is preserved as a record. When the predetermined period of time has elapsed, the engaging section is reset by the built-in timer, and the relay Y-1 is deenergized. As a result, the automatic telephone answering device is disengaged from the telephone lines L1 and L2.

Sine the paged person receives only a beep tone page so that he does not know the calling party, the paged person calls the automatic telephone device with a public telephone or the like (not shown) and sends a remote control signal. The remote control signal is detected by the remote control signal detector 14 through the line transformer LT and is then supplied to the remote controller 15. In response to the output from the remote controller 15, the record/play unit 7 is set in the play mode for playing the incoming message tape T-2. The incoming message tape T-2 is rewound and played back by the tape controller 3. The paged person hears the name and telephone number of the calling parties one-by-one, as in a conventional TAD. When the paged person hangs up the telephone, the incoming message tape T-2 is stopped via the line monitor circuit 1, so that the telephone answering device is set in the standby mode. The time selection switch 5 can be switched in response to another remote control signal. In this case, the operating time of the timer 4 is changed to leave the name of a paged person and a brief message.

In the above embodiment, the speed dialing number is used to save dialing time in paging a specific person. When a dialing pulse type telephone set is used in the telephone exchange system, the relay Y-1 is controlled by the telephone number stored in the digital switch 16, and the dial pulse is sent through its contact y1-1.

When the calling party does not give his name and telephone number after the second outgoing message, the signal detector 8 detects a nonsignal duration. The incoming message tape T-2 is stopped by the tape controller 3. The output from the tape controller 3 resets the engaging section 2, as described previously. In this case, unlike in the previous case where the calling party records his name and phone number, tape controller 3 provides a reset signal having a time duration longer than the timing period of the timer built in to engaging section 2.

Figure 4:
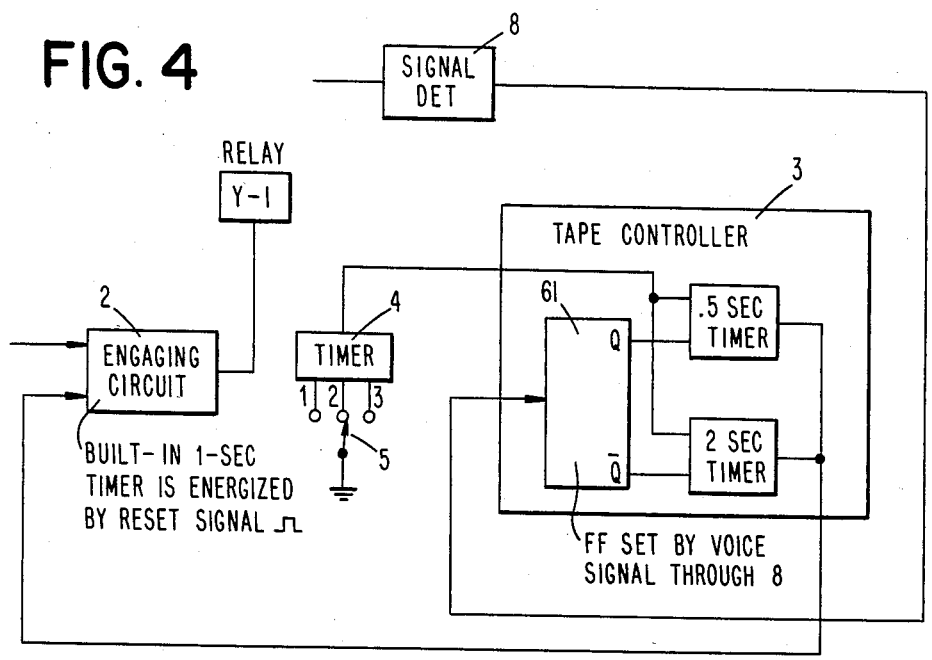
FIG. 4 shows a detail of the tape controller 3.
Figure 4:
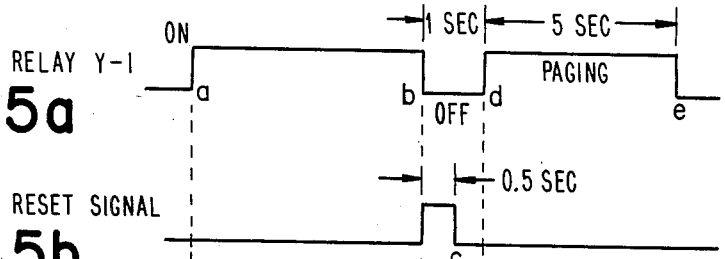
Figure 4:
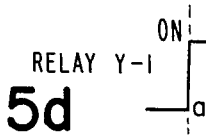
Figure 4:
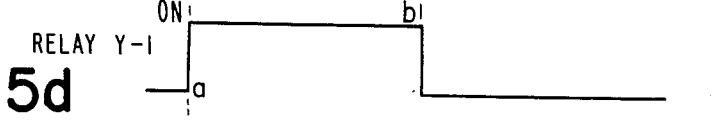

That is, as illustratively shown in FIG. 4, tape controller 3 includes a flip-flop 61 which provides two reset signals, having two respective time durations. Both signals, having durations of 0.5 seconds and 2 seconds, for example, may be provided to engaging section 2 under control of signal detector 8. Engaging section 2 includes a built in internal timer. The internal timer is utilized to reengage the telephone lines and to begin the paging operation after passage of a predetermined time after disengaging of the telephone lines. The time durations of the two reset signals generated by controller 3 are selected to be shorter and longer, respectively, than the predetermined time. Thus, for a one second timer in engaging circuit, the 0.5 second and 2 second intervals are appropriate. If the shorter 0.5 second reset signal is provided to the engaging section, the 1 second timer output is not covered, so that an output signal is provided and reengagement of the telephone lines can occur and the paging operation will begin. However, if the longer 2 second signal is provided by controller 3 to the engaging section, the one second timer is covered so that load relay Y-1 is not operated and the phone lines can not engage, thus inhibiting performance of a paging operation.

As shown at FIG. 5a, the signal output by engaging section 2 rises, beginning at a time a, to activate relay Y-1 and to engage the telephone lines, upon detection of a ring signal, for example. At time b, after termination of a time period selected by switch 5, the output signal of engaging section 2 drops for a period determined by the built in timer, such as 1 second. At time d, one second subsequent to time b, the output of engaging section 2 rises to activate relay Y-1 and once more to engage the telephone lines, for a time period of 5 seconds sufficient to provide speed dialing or pulse dialing of the paged telephone number. As shown at FIG. 5b, when a 0.5 second reset signal is provided by flip-flop 61 of tape controller 3, the 1 second interval b-d is not fully covered so that the output of engaging section 2 rises at timed, relay Y-1 is activated and the telephone lines are reengaged. Thus, the time chart shown at FIG. 5a is applicable. However, in a situation where the long duration reset signal, as shown at FIG. 5c is output by the tape controller 3, the 1 second time period is initiated by the rising portion of the reset signal, but in view of the extended duration of the reset signal, the timing out of the built in timer within engaging circuit 2 is covered, so that relay Y-1 is not reactivated and the telephone lines are not reengaged. In this event, the output signal from engaging section 2 is illustrated as shown at FIG. 5d. Therein, the high level output is provided only until time point b. Since the long duration covers the predetermined time interval, the relay Y-1 is not activated and contact y1-1 is not closed.

Figure 3:
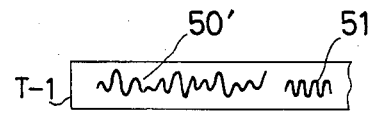
FIG. 3 is a representation for explaining a recorded content as an outgoing message on an outgoing message tape according to another embodiment of the present invention.

The operation of the second embodiment will be described hereinafter. The operation of the second embodiment is substantially the same as that of the first embodiment except for the recorded contents of the outgoing message on the outgoing message tape T-1 shown in FIG. 3. Referring to FIG. 3, after the outgoing message 50' corresponding to the first and second messages 50 and 52 of FIG. 2 is completely played, the beep tone 51 is sent. The beep tone 51 is detected by the signal detector 8. An output from the signal detector 8 is supplied to the tape controller 3 to stop the outgoing message tape T-1 and start the incoming message tape T-2 at normal speed. An incoming message from the calling party is recorded on the incoming message tape T-2. The "#" button of the pushbutton phone can be depressed while the outgoing message is being sent or after the incoming message tape T-2 is switched t the record mode upon generation of the last beep tone of the outgoing message. In any case, the last beep tone is detected by the special code detector 9 to stop the outgoing message tape T-1 and start the incoming message tape T-2 in the record mode.

The way of recording the outgoing message in this embodiment is different from that in the first embodiment. The first embodiment, only when the calling party does not speak for several seconds is the instruction message 52 generated, even if the beep tone 51 follows the normal outgoing message 50. However, in the second embodiment, the instruction message is included in the normal outgoing message. The method of recording outgoing messages can be selected by the user.

The foregong description of the preferred embodiments of the invention has been presented for purposes of illustration and description and is not intended to be exhaustive or to limit the invention ot the precise forms disclosed, since many obvious modifications and variations are possible in the light of the above teaching. The embodiments were chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

What is claimed is:

1. An automatic telephone answering device connectable to a telephone line for delivering at least one outgoing message upon receiving an incoming call on said line and for allowing the caller to record a message with a paging function which the caller may activate by remote control, comprising:
   first sending means for sending to a calling party a first prerecorded outgoing message representing a normal outgoing message upon receipt of said incoming call and second sending means for sending to the calling party a second prerecorded outgoing message separated from said first outgoing message by a recorded beep tone where said second outgoing message provides paging instructions to enable a calling party to urgently contact an owner of said automatic telephone answering device;
   first setting means for setting an incoming message tape in a record mode to record an incoming message from the calling party in response to a beep tone generation means upon completion of the sending of the first outgoing message;
   detecting means for detecting when the calling party does not provide an incoming message;
   said second sending means responsive to said detecting means for sending the second outgoing message when the calling party does not provide an incoming message after the beep tone is generated;
   second setting means for setting said incoming message tape in a record mode to receive a short incoming message from the calling party after receiving a special code signal sent by the calling party during or upon completion of the second outgoing message;
   responsive means for detecting said special code signal sent by the calling party during or upon completion of the sending of the second outgoing message;
   means for storing a prestored telephone number; and
   operating means controlled by said responsive means for temporarily disengaging said automatic telephone answering device from the telephone line in response to said code signal, for thereafter re-engaging said telephone answering device to the telephone line, and for dialing said prestored telephone number.

2. A device according to claim 1, wherein said first sending means is responsive to said detecting means for stopping the incoming message tape when the calling party does not provide the incoming message after the beep tone is sent, and wherein said second sending means is operable in response to said detecting means for driving the outgoing message tape to send the second outgoing message.

3. an automatic telephone answering device as recited in claim 1, when said operating means and said means for storing said prestored telephone number are included in a paging means.

4. An automatic telephone answering device with a paging function as recited in claim 1 further comprising means for certifying dialing of said prestored telephone number by recording dialing of the prestored telephone number on said incoming message tape.

5. An automatic telephone answering device connectable to a telephone line for delivering at least one outgoing message upon receiving an incoming call on said line and for allowing a calling party to record a message with a paging function which the calling party may activate by remote control, comprising:
   first sending means for sending to the calling party a prerecorded outgoing message representing a normal outgoing message and for providing paging instructions to enable the calling party to urgently contact an owner of said automatic telephone answering device upon reception of an incoming call from the calling party;
   second sending means for sending a beep tone to the calling party upon completion of the sending of the outgoing message, for recording an incoming message on an incoming message medium, and setting the telephone answering device in a standby mode;
   means for storing a telephone number corresponding to a destination to be paged;
   paging means for disengaging the telephone answering device from telephone lines when the calling party sends a code signal in accordance with the instruction of the outgoing message before the telephone answering device is set in the standby mode, and then forming an engaging circuit for the telephone lines to call a destination to be paged; and means for setting the telephone answering device in the standby mode after paging so as to allow the telephone answering device to receive a next incoming call.

6. A method for automatic answering of a telephone call received over a telephone line, including delivering of at least one outgoing message to a calling party after which the calling party may record a message and for paging a user utilizing a telephone answering device which calls a prestored telephone number, comprising the steps of:

after detecting an incoming call from said telephone line, sending to the calling party a first prerecorded outgoing message representing a normal outgoing message, and sending to the calling party a second prerecorded outgoing message separated from said first outgoing message by a recorded beep tone for providing paging instructions to a calling party who wishes to urgently contact an owner of said automatic telephone answering device;

setting an incoming message medium in a record mode in response to the beep tone generated upon completion of the sending of the first outgoing message;

detecting when the calling party does not provide an incoming message;

sending the second outgoing message after the beep tone is detected when the calling party does not provide an incoming message;

in response to a special code signal sent by the calling party setting an incoming message in a record mode to record a short incoming message from the calling party; and temporarily disengaging the automatic telephone answering device from the telephone line after said short message is recorded and thereafter reengaging said telephone answering device to the telephone line, and dialing said prestored telephone number.

7. A method as recited in claim 6 further comprising the steps of stopping the incoming message tape when the calling party does not provide the incoming message after the beep tone is sent, and driving the outgoing message tape to send the second outgoing message.

8. A method as recited in claim 6 further comprising the steps of driving the incoming message tape in the record mode when the calling party does not provide the incoming message even when the second prerecorded outgoing message is being played back of the outgoing message tape is being driven.

9. A method as recited in claim 6 further comprising the steps of determining passage of a predetermined time period, and recording the incoming message on the incoming message tape during said predetermined time period after the calling party sends the special code signal.

10. A method for automatic answering of a telephone call received over a telephone line including delivery at least one outgoing message to a calling party after which the caller may record a message and for paging a user using a telephone answering device which calls a destination to be paged upon the reception of a code signal sent by the calling party, comprising the steps of:

sending to a calling party an outgoing message prerecorded on an outgoing message medium representing a normal outgoing message and for providing paging instructions to enable the calling party to urgently contact an owner of said automatic telephone answering device upon reception of an incoming call from the calling party;

sending a beep tone to the calling party upon completion of the sending of the outgoing message, for recording a short incoming message from the calling party on an incoming message medium;

disengaging the telephone answering device from the telephone line when the callng party sends a code signal in accordance with the instructions of the outgoing message before the telephone answering device is set in a standby mode and then forming an engaging circuit with said telephone line to call said destination to be paged; and setting the telephone answering device in the standby mode after paging so as to allow the telephone answering device to receive a next incoming call.

11. A method as recited in claim 10 comprising the further step of certifying dialing of said prestored telephone number by recording dialing of the prestored telephone number on said incoming message medium.

* * * * *